US012568874B2

(12) United States Patent
Thompson et al.

(10) Patent No.: US 12,568,874 B2
(45) Date of Patent: Mar. 10, 2026

(54) PLUG DETECTION SYSTEM FOR AN AGRICULTURAL SYSTEM

(71) Applicant: CNH Industrial Canada, Ltd., Saskatoon (CA)

(72) Inventors: Dennis George Thompson, Eagle Ridge (CA); Nicholas George Alfred Ryder, Saskatoon (CA); Ashish Jagannath Dubey, Saskatoon (CA); Prabhakar Prafulla Pandit, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 463 days.

(21) Appl. No.: 18/323,546

(22) Filed: May 25, 2023

(65) Prior Publication Data

US 2024/0389498 A1 Nov. 28, 2024

(51) Int. Cl.
*A01C 7/10* (2006.01)
*A01C 7/08* (2006.01)
*A01C 7/20* (2006.01)

(52) U.S. Cl.
CPC .............. *A01C 7/102* (2013.01); *A01C 7/082* (2013.01); *A01C 7/205* (2013.01)

(58) Field of Classification Search
CPC .. A01C 7/102; A01C 7/10; A01C 7/08; A01C 7/00; A01C 7/082; A01C 7/081; A01C 7/205; A01C 7/201; A01C 7/20
See application file for complete search history.

(56) References Cited

U.S. PATENT DOCUMENTS

| | | | |
|---|---|---|---|
| 6,003,455 | A | 12/1999 | Flamme et al. |
| 6,070,539 | A | 6/2000 | Flamme et al. |
| 6,158,363 | A | 12/2000 | Memory et al. |

(Continued)

FOREIGN PATENT DOCUMENTS

| | | |
|---|---|---|
| CA | 2291598 | 5/2001 |
| CA | 2398143 | 2/2004 |

(Continued)

OTHER PUBLICATIONS

U.S. Appl. No. 18/323,560, filed May 25, 2023, Dennis George Thompson.

(Continued)

*Primary Examiner* — Christopher J. Novosad
(74) *Attorney, Agent, or Firm* — Fletcher Yoder, P.C.

(57) ABSTRACT

A plug detection system for an agricultural system includes a controller configured to receive first sensor signals indicative of a set of upstream air pressures. The controller is configured to receive second sensor signals indicative of a set of downstream air pressures. The controller is configured to determine a downstream pressure variance based on the set of downstream air pressures. The controller is configured to determine a set of pressure drops based on the set of upstream air pressures and the set of downstream air pressures, and the controller is configured to determine a pressure drop variance based on the set of pressure drops. The controller is configured to determine a variance delta based on the pressure drop variance and the downstream pressure variance, and the controller is configured to identify an impending plugging condition in response to determining the variance delta is greater than a threshold value.

20 Claims, 4 Drawing Sheets

(56)  References Cited

U.S. PATENT DOCUMENTS

| | | |
|---|---|---|
| 6,296,425 B1 | 10/2001 | Memory et al. |
| 6,584,920 B1 | 7/2003 | Cresswell |
| 8,504,310 B2 | 8/2013 | Landphair et al. |
| 8,928,486 B2 | 1/2015 | Hui et al. |
| 9,615,506 B2 | 4/2017 | Ruppert et al. |
| 9,739,654 B2 | 8/2017 | Binsirawanich et al. |
| 9,788,475 B2 | 10/2017 | Henry |
| 9,989,393 B2 | 6/2018 | Hossain et al. |
| 10,791,727 B2 | 10/2020 | Roberge et al. |
| 10,820,483 B2 | 11/2020 | Gervais et al. |
| 10,820,484 B2 | 11/2020 | Gervais et al. |
| 10,820,486 B2 | 11/2020 | Gervais et al. |
| 10,918,010 B2 | 2/2021 | Gervais et al. |
| 11,432,456 B2 | 9/2022 | Donadon et al. |
| 2021/0007272 A1 | 1/2021 | Schoeny et al. |
| 2021/0372441 A1 | 12/2021 | Kale et al. |
| 2021/0386009 A1 | 12/2021 | Engel et al. |
| 2022/0279705 A1 | 9/2022 | Plattner |
| 2022/0279706 A1 | 9/2022 | Boufleur et al. |
| 2023/0039311 A1 | 2/2023 | Thompson |

FOREIGN PATENT DOCUMENTS

| | | |
|---|---|---|
| CA | 2803403 | 7/2013 |
| EP | 2932818 | 10/2015 |
| WO | 2021183027 | 9/2021 |
| WO | 2022191766 | 9/2022 |

OTHER PUBLICATIONS

U.S. Appl. No. 18/323,859, filed May 25, 2023, Dennis George Thompson.

PLUG DETECTION SYSTEM FOR AN AGRICULTURAL SYSTEM

BACKGROUND

The present disclosure relates generally to a plug detection system for an agricultural system.

Generally, agricultural seeding implements are towed behind a work vehicle, such as a tractor. The agricultural seeding implement may include multiple rows of ground engaging opener assemblies to excavate trenches into soil for depositing an agricultural product, such as seed or fertilizer. An air cart may be towed behind or in front of the agricultural seeding implement and configured to provide the agricultural product to the ground engaging opener assemblies. In this manner, rows of the agricultural product may be deposited into the soil.

The agricultural product may be pneumatically conveyed from the air cart to the ground engaging opener assemblies via distribution lines (e.g., primary lines, secondary lines, tertiary lines, etc.). For example, the air cart may include an air source configured to output an air flow, and multiple primary lines may extend from the air source. A metering system positioned downstream from the air source may meter the agricultural product into the primary lines, and the air flow may fluidize and convey the agricultural product toward the ground engaging opener assemblies. Unfortunately, if the air flow provided by the air source is not sufficient, at least one distribution line (e.g., primary line, secondary line, tertiary line, etc.) may become plugged with the agricultural product, thereby interfering with flow of the agricultural product to one or more ground engaging opener assemblies.

BRIEF DESCRIPTION

In certain embodiments, a plug detection system for an agricultural system includes a controller having a memory and a processor. The controller is configured to receive first sensor signals indicative of a set of upstream air pressures at an upstream location of a primary line between a metering system and a row unit. The controller is also configured to receive second sensor signals indicative of a set of downstream air pressures at a downstream location of the primary line between the metering system and the row unit, in which the downstream location is downstream from the upstream location. Furthermore, the controller is configured to determine a mean downstream air pressure based on the set of downstream air pressures, and the controller is configured to determine a downstream pressure variance based on the set of downstream air pressures and the mean downstream air pressure. In addition, the controller is configured to determine a set of pressure drops based on the set of upstream air pressures and the set of downstream air pressures, determine a mean pressure drop based on the set of pressure drops, and determine a pressure drop variance based on the set of pressure drops and the mean pressure drop. The controller is also configured to determine a variance delta based on the pressure drop variance and the downstream pressure variance, identify an impending plugging condition in response to determining the variance delta is greater than a threshold value, and output an output signal indicative of the impending plugging condition in response to identifying the impending plugging condition.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
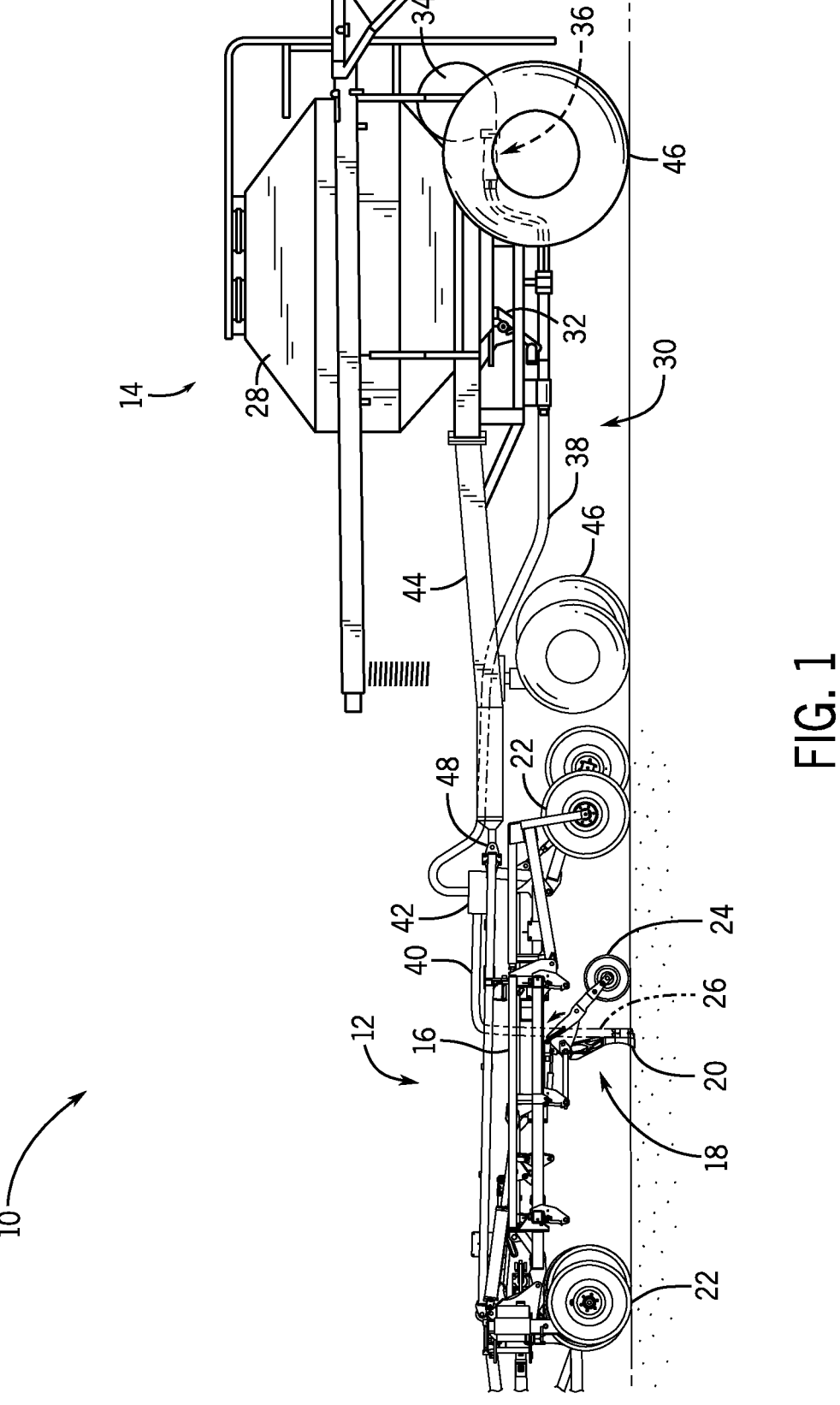
FIG. 1 is a side view of an embodiment of an agricultural system having an agricultural seeding implement and an air cart.

FIG. 1 is a side view of an embodiment of an agricultural system 10 having an agricultural seeding implement 12 and an air cart 14. In the illustrated embodiment, the agricultural seeding implement 12 includes a tool frame 16, and a row unit 18, which includes an opener 20, is coupled to the tool frame 16. As illustrated, wheel assemblies 22 are also coupled to the tool frame 16. The agricultural seeding implement 12 may be pulled through a field by a work vehicle (e.g., a tractor), and the agricultural seeding implement 12 may deposit rows of agricultural product (e.g., seed, fertilizer, inoculant, etc.) into the soil as the agricultural seeding implement 12 traverses the field. The wheel assemblies 22 contact the soil surface and enable the agricultural seeding implement 12 to be pulled by the work vehicle, and the row unit 18 may deposit one row of the agricultural product into the soil. Although only one row unit 18 is shown coupled to the tool frame 16 for clarity, the agricultural seeding implement 12 may include multiple row units 18 (e.g., organized in one or more rows across the agricultural seeding implement 12). In some embodiments, the agricultural seeding implement 12 may include 12, 14, 16, 18, 20, or more row units 18, each of which may deposit agricultural product into the soil to form a respective row.

To facilitate depositing the agricultural product within the soil, each row unit 18 includes the opener 20, a press wheel 24, and at least one agricultural product tube 26. In response to movement of the row unit 18 through the field, the opener 20 exerts a force onto the soil that excavates a trench within the soil. As the agricultural seeding implement 12 moves through the field, the row unit 18 may deposit the agricultural product into the excavated trench via the agricultural product tube(s) 26. Then, the press wheel 24 may pack soil onto the deposited agricultural product.

In the illustrated embodiment, the air cart 14 includes at least one storage tank 28 configured to centrally store the agricultural product. In addition, the agricultural system 10 includes distribution lines 30 configured to facilitate flow of the agricultural product to the row units 18. Furthermore, the air cart 14 includes a metering system 32 configured to control a flow rate of the agricultural product into the distribution lines 30. The air cart 14 also includes an air source 34 configured to provide an air flow through the distribution lines 30. The air flow interacts with the agricultural product flowing into the distribution lines 30 from the metering system 32, thereby fluidizing the agricultural product and forming an air/agricultural product mixture. The distribution lines 30 are configured to transport the air/agricultural product mixture to the row units 18, thereby providing the row units 18 with a metered flow of the agricultural product.

In the illustrated embodiment, the air cart 14 includes a plenum 36 coupled to the air source 34. The plenum 36 is configured to distribute the air flow provided by the air source 34 across multiple primary lines 38 of the distribution lines 30. The metering system 32 controls the flow of the agricultural product into the primary lines 38, and the air flow through the primary lines 38 fluidizes the agricultural product and conveys the agricultural product toward the row units 18. In addition, the distribution lines 30 include secondary lines 40 coupled to each primary line 38 via a respective distribution header 42. Each distribution header 42 is configured to distribute the air/agricultural product mixture provided by a respective primary line 38 to multiple secondary lines 40. In the illustrated embodiment, each secondary line 40 is coupled to a respective row unit 18. Accordingly, the agricultural product is conveyed from a storage tank 28 to the row units 18 via the primary lines 38, the distribution headers 42, and the secondary lines 40. However, in other embodiments, the agricultural system may include a secondary distribution header coupled to each secondary line, and multiple tertiary lines may be coupled to each secondary distribution header. In such embodiments, each tertiary line may be coupled to a respective row unit, such that the agricultural product is distributed via the primary lines, primary distribution headers, secondary lines, secondary distribution headers, and tertiary lines. Furthermore, in certain embodiments, the secondary lines and the distribution headers may be omitted, and the primary lines may be directly coupled to respective row units.

In the illustrated embodiment, the air cart 14 includes a frame 44 configured to support the storage compartment 28, the metering system 32, the air source 34, and the plenum 36. The air cart 14 also includes wheels 46 rotatably coupled to the frame 44 and configured to facilitate movement of the air cart 14 through the field. In the illustrated embodiment, the air cart 14 is towed behind the agricultural seeding implement 12. Accordingly, the agricultural seeding implement 12 is coupled to the work vehicle by a first hitch assembly, and the air cart 14 is coupled to the agricultural seeding implement 12 by a second hitch assembly 48. However, in other embodiments, the agricultural seeding implement may be towed behind the air cart. In further embodiments, the agricultural seeding implement and the air cart may be part of a single unit that is towed behind a work vehicle, or the agricultural seeding implement and the air cart may be elements of a self-propelled vehicle.

In certain embodiments, the agricultural system 10 includes a plug detection system configured to identify an impending plugging condition within the distribution lines 30. The plug detection system includes a controller and a memory. The controller is configured to receive a first set of signals (e.g., from a first sensor) indicative of a set of upstream air pressures at an upstream location of a primary line 38 between the metering system 32 and the row unit(s) 18. The controller is also configured to receive a second set of signals (e.g., from a second sensor) indicative of a set of downstream air pressures at a downstream location of the primary line 38 between the metering system 32 and the row unit(s) 18, in which the downstream location is downstream from the upstream location. Furthermore, the controller is configured to determine a mean downstream air pressure based on the set of downstream air pressures, and the controller is configured to determine a downstream pressure variance based on the set of downstream air pressures and the mean downstream air pressure. In addition, the controller is configured to determine a set of pressure drops based on the set of upstream air pressures and the set of downstream air pressures, the controller is configured to determine a mean pressure drop based on the set of pressure drops, and the controller is configured to determine a pressure drop variance based on the set of pressure drops and the mean pressure drop. The controller is also configured to determine a variance delta based on the pressure drop variance and the downstream pressure variance, the controller is configured to identify an impending plugging condition in response to determining the variance delta is greater than a threshold value, and the controller is configured to output an output signal indicative of the impending plugging condition in response to identifying the impending plugging condition. The impending plugging condition may correspond to an operating condition (e.g., with insufficient air flow) that has a substantial potential to ultimately result in plugging (e.g., a buildup of agricultural product within one or more distribution lines, such as the monitored primary line and/or at least one secondary line downstream from the monitored primary line). Because the plug detection system may detect the operating condition that has a substantial potential to ultimately result in plugging, the operator or the controller may control the air flow from the air source to substantially reduce or eliminate the possibility of plugging before the plugging occurs. As a result, the agricultural product flow to the row units may be substantially maintained at a target flow rate, thereby enhancing the effectiveness of the agricultural system.

Figure 2:
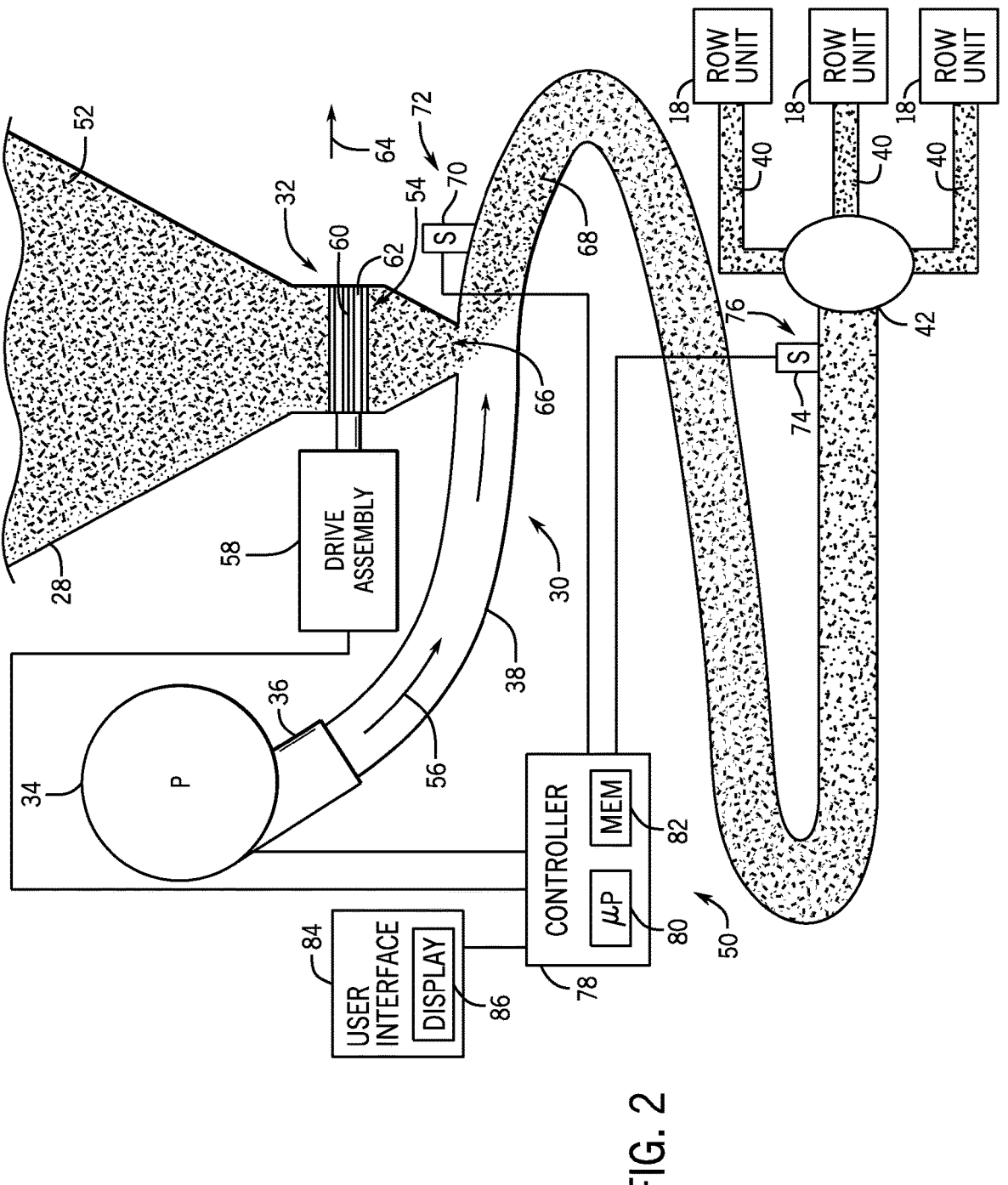
FIG. 2 is a schematic diagram of an embodiment of a plug detection system that may be employed within the agricultural system of FIG. 1.

FIG. 2 is a schematic diagram of an embodiment of a plug detection system 50 that may be employed within the air cart of FIG. 1. As previously discussed, the air source 34 is coupled to a primary line 38 of the distribution lines 30 via the plenum 36. The air source 34 may include fan(s), pump(s), blower(s), or a combination thereof, driven by suitable motor(s), such as electric motor(s), hydraulic motor(s), pneumatic motor(s), etc. Flowable agricultural product 52 (e.g., seed, fertilizer, etc.) within a storage tank 28 flows under the influence of gravity into the metering system 32. In certain embodiments, the storage tank 28 is pressurized such that a static pressure in the storage tank 28 is greater than a static pressure in the primary line 38, thereby facilitating an even flow of the agricultural product through the metering system 32. However, in other embodiments, the storage tank may be unpressurized. The metering system 32 includes one or more meter rollers 54 configured to control the flow of the agricultural product 52 into the air flow 56 output by the air source 34. In certain embodiments, the metering system 32 may include multiple meter rollers 54 (e.g., housed within individual meter boxes) disposed adjacent to one another. For example, certain metering systems may include twelve meter rollers, each housed within an individual meter box and each configured to control flow of the agricultural product into a respective primary line 38 for distribution to one or more respective row units of the agricultural seeding implement. In further embodiments, the metering system may include more or fewer meter rollers, e.g., 1, 2, 3, 4, 5, 6, 7, 8, 9, 10, 11, 13, or more. By independently adjusting the rotation speed of each meter roller, flow of the particulate material to different portions of the agricultural seeding implement may be particularly controlled.

In the illustrated embodiment, the meter roller 54 is coupled to a drive assembly 58 configured to drive the meter roller 54 to rotate. In certain embodiments, the drive assembly 58 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly may be coupled to a wheel (e.g., via a gear assembly) such that rotation of the wheel drives the meter roller to rotate. Such a configuration automatically varies the rotation rate of the meter roller based on the ground speed of the air cart.

In the illustrated embodiment, the meter roller 54 includes multiple flutes 60 and corresponding recesses 62, in which the flutes and corresponding recesses are configured to meter the flowable agricultural product via rotation of the meter roller 54. As illustrated, each recess 62 is disposed between a respective pair of flutes 60. As the meter roller 54 rotates, the respective pair of flutes 60 moves the flowable agricultural product 52 disposed within the respective recess 62 downwardly, thereby transferring the flowable agricultural product 52 to the primary line 38. The number and geometry of the flutes may be particularly configured to accommodate the agricultural product being distributed. Certain meter rollers may include six flutes and a corresponding number of recesses. Other meter rollers may include more or fewer flutes and/or recesses. For example, the meter roller may include 1, 2, 3, 4, 5, 6, 7, 8, 9, 10, 11, 12, 13, 14, 15, 16, 17, 18, 19, 20, or more flutes and/or recesses. In addition, the depth of the recesses and/or the height of the flutes is configured to accommodate the agricultural product metered by the meter roller 54. For example, a meter roller having deeper recesses and fewer flutes may be employed for larger seeds, while a meter roller having shallower recesses and more flutes may be employed for smaller seeds. Other parameters, such as flute pitch (i.e., angle of the flute relative to a longitudinal/rotational axis of the meter roller) and flute angle (i.e., angle of the flute relative to a radial axis of the meter roller), may also be particularly selected to accommodate the flowable agricultural product.

In the illustrated embodiment, the rotational axis of the meter roller 54 is oriented substantially parallel to a direction of travel 64 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 64).

By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the meter roller 54 controls the flow of the agricultural product 52 into the air flow 56. For example, as the meter roller 54 rotates, the meter roller transfers the agricultural product through an opening 66 in the metering system 32 into the primary line 38. The agricultural product then mixes with air from the air source 34, thereby forming an air/agricultural product mixture 68. The mixture then flows to the respective row unit(s) 18 of the agricultural seeding implement, where the flowable agricultural product (e.g., seed and/or fertilizer) is deposited within the soil.

Different agricultural products may include particles of different sizes. For example, seeds, such as sunflower seeds, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of agricultural product being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable agricultural product and for a target dispensing rate (e.g., a target rate for particular field conditions, climate, expected yield, etc.).

In the illustrated embodiment, the plug detection system 50 includes a first sensor 70 fluidly coupled to the primary line 38 at an upstream location 72 between the metering system 32 and the row units 18. The first sensor 70 is configured to output a first set of sensor signals indicative of a set of upstream air pressures within the primary line 38. In addition, the plug detection system 50 includes a second sensor 74 fluidly coupled to the primary line 38 at a downstream location 76 between the metering system 32 and the row units 18. As illustrated, the downstream location 76 is downstream from the upstream location 72 relative to the direction of the air flow 56 through the primary line 38. The second sensor 74 is configured to output a second set of sensor signals indicative of a set of downstream air pressures within the primary line 38. Each sensor may include any suitable type(s) of sensing device(s) configured to monitor the air pressure within the primary line, such as a piezoelectric pressure sensor, a capacitive pressure sensor, etc.

In certain embodiments, the first sensor 70 may be positioned proximate to the metering system 32 (e.g., within 1 meter of the metering system 32, within 0.5 meters of the metering system 32, within 0.25 meters of the metering system 32, etc.), and the second sensor 74 may be positioned a suitable distance downstream from the first sensor 70 (e.g., 3 meters, 6 meters, 9 meters, 12 meters, 15 meters, etc.). For example, the second sensor 74 may be positioned proximate to the distribution header 42 (e.g., within 1 meter of the distribution header 42, within 0.5 meters of the distribution header 42, within 0.25 meters of the distribution header 42, etc.). While positioning the first sensor 70 proximate to the metering system 32 is disclosed above, in certain embodiments, the first sensor may be positioned at any other suitable location along the primary line (e.g., between the metering system and the distribution header). Furthermore, while positioning the second sensor 74 proximate to the distribution header 42 is disclosed above, in certain embodiments, the second sensor may be positioned at any other suitable location along the primary line (e.g., between the metering system and the distribution header). The first and second sensors may be separated from one another by any suitable distance along the primary line (e.g., 3 meters, 6 meters, 9 meters, 12 meters, 15 meters, etc.).

Furthermore, in the illustrated embodiment, the plug detection system 50 includes a controller 78 communicatively coupled to the first sensor 70 and to the second sensor 74. In certain embodiments, the controller 78 is an electronic controller having electrical circuitry configured to receive the first set of sensor signals from the first sensor 70 and the second set of sensor signals from the second sensor 74. In the illustrated embodiment, the controller 78 includes a processor, such as the illustrated microprocessor 80, and a memory device 82. The controller 78 may also include one or more storage devices and/or other suitable components. The processor 80 may be used to execute software, such as software for identifying an impending plugging condition based on feedback from the first and second sensors, and so forth. Moreover, the processor 80 may include multiple microprocessors, one or more "general-purpose" microprocessors, one or more special-purpose microprocessors, and/ or one or more application specific integrated circuits (ASICs), or some combination thereof. For example, the processor 80 may include one or more reduced instruction set (RISC) processors.

The memory device 82 may include a volatile memory, such as random access memory (RAM), and/or a nonvolatile memory, such as read-only memory (ROM). The memory device 82 may store a variety of information and may be used for various purposes. For example, the memory device 82 may store processor-executable instructions (e.g., firmware or software) for the processor 80 to execute, such as instructions for identifying an impending plugging condition based on feedback from the first and second sensors, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for identifying an impending plugging condition based on feedback from the first and second sensors, etc.), and any other suitable data.

In the illustrated embodiment, the plug detection system 50 includes a user interface 84 communicatively coupled to the controller 78. The user interface 84 is configured to receive input from an operator and to provide information to the operator. The user interface 84 may include any suitable input device(s) for receiving input, such as a keyboard, a mouse, button(s), switch(es), knob(s), other suitable input device(s), or a combination thereof. In addition, the user interface 84 may include any suitable output device(s) for presenting information to the operator, such as speaker(s), indicator light(s), other suitable output device(s), or a combination thereof. In the illustrated embodiment, the user interface 84 includes a display 86 configured to present visual information to the operator. In certain embodiments, the display 86 may include a touchscreen interface configured to receive input from the operator.

The controller 78 is configured to receive the first set of sensor signals from the first sensor 70, and the controller is configured to receive the second set of sensor signals from the second sensor 74. As previously discussed, the first set of sensor signals is indicative of a set of upstream air pressures at the upstream location 72 of the primary line 38, and the second set of sensor signals is indicative of a set of downstream air pressures at the downstream location 76 of the primary line.

Furthermore, the controller 78 is configured to determine a mean downstream air pressure based on the set of downstream air pressures. For example, the controller may sum the downstream air pressures within the set and divide by the number of downstream air pressures within the set. The set of downstream air pressures may include any suitable number of downstream air pressures, such as 2, 4, 6, 8, 10, 12, 14, 16, 18, 20, or more. In addition, each downstream air pressure of the set may be monitored at a respective time. For example, the controller 78 may sample the downstream air pressures at a suitable interval, such as 0.05 seconds, 0.1 seconds, 0.25 seconds, 0.5 seconds, 1 second, 1.5 seconds, 2 seconds, 3 seconds, 4 seconds, 5 seconds, etc. Accordingly, the mean downstream air pressure may correspond to the average downstream air pressure over a period of time (e.g., equal to the number of samples multiplied by the interval).

The controller 78 is also configured to determine a downstream pressure variance based on the set of downstream air pressures and the mean downstream air pressure. For example, the downstream pressure variance may be determined by the following equation:

$$V_{downstream} = \frac{\sum_{i=1}^{n}(P_{i\,downstream} - P_{mean\ downstream})^2}{n-1}$$

where, $V_{downstream}$ is the downstream pressure variance, n is the number of downstream air pressures/samples within the set of downstream air pressures, $P_{i\,downstream}$ is a downstream air pressure within the set of downstream air pressures, and $P_{mean\ downstream}$ is the mean downstream air pressure.

In addition, the controller 78 is configured to determine a set of pressure drops based on the set of upstream air pressures and the set of downstream air pressures. The set of upstream air pressures may include a number of upstream air pressures equal to the number of downstream air pressures within the set of downstream air pressures. In addition, each upstream air pressure of the set of upstream air pressures may be monitored during the same sample (e.g., at substantially the same time) as a respective downstream air pressure of the set of downstream air pressures. Accordingly, the controller 78 may sample the upstream air pressures at the same interval as the downstream air pressures. As used herein, "substantially the same time" may refer to a time variation of less than 0.5 seconds, less than 0.2 seconds, less than 0.1 seconds, less than 0.05 seconds, or less than 0.01 seconds. To determine the set of downstream pressure drops, the controller may subtract each downstream air pressure of the set of downstream air pressures from a respective upstream air pressure of the set of upstream air pressures (e.g., upstream air pressure taken during the same sample as the downstream air pressure).

The controller 78 is also configured to determine a mean pressure drop based on the set of pressure drops. For example, the controller may sum the pressure drops within the set and divide by the number of pressure drops within the set. The set of pressure drops may include the same number of pressure drops as the number of upstream pressures within the set of upstream pressures and the number of downstream pressures within the set of downstream pressures. The mean pressure drop may correspond to the average pressure drop over a period of time (e.g., equal to the number of samples multiplied by the interval).

Furthermore, the controller 78 is configured to determine a pressure drop variance based on the set of pressure drops and the mean pressure drop. For example, the pressure drop variance may be determined by the following equation:

$$V_{pressure\ drop} = \frac{\sum_{i=1}^{n} (P_{i\ pressure\ drop} - P_{mean\ pressure\ drop})^2}{n-1}$$

where, $V_{pressure}$ drop is the pressure drop variance, n is the number of pressure drops/samples within the set of pressure drops (e.g., equal to the number of downstream air pressures/samples within the set of downstream air pressures), $P_{i\ pressure\ drop}$ is a pressure drop within the set of pressure drops, and $P_{mean\ pressure\ drop}$ is the mean pressure drop.

The controller 78 is also configured to determine a variance delta based on the pressure drop variance and the downstream pressure variance. For example, the controller 78 may determine the variance delta by subtracting the pressure drop variance from the downstream pressure variance.

In addition, the controller 78 is configured to compare the variance delta to a threshold value (e.g., 1 kPa, 2 kPa, 4 kPa, 6 kPa, etc.), and identify an impending plugging condition in response to determining the variance delta is greater than the threshold value. The controller 78 is also configured to output an output signal indicative of the impending plugging condition in response to identifying the impending plugging condition. The impending plugging condition may correspond to an operating condition (e.g., with insufficient air flow) that has a substantial potential to ultimately result in plugging (e.g., a buildup of agricultural product within the primary line 38 and/or within at least one of the secondary lines 40 downstream from the primary line 38). Because the plug detection system may detect the operating condition that has a substantial potential to ultimately result in plugging, the operator or the controller 78 may control the air flow from the air source 34 to substantially reduce or eliminate the possibility of plugging before the plugging occurs. As a result, the agricultural product flow to the row units 18 may be substantially maintained at a target flow rate, thereby enhancing the effectiveness of the agricultural system.

The process disclosed above may be iteratively performed during operation of the agricultural system. Accordingly, the impending plugging condition may be identified throughout the operation of the agricultural system. For example, as the number of downstream air pressure samples/number of upstream air pressure samples increases, the method may be performed using sets formed from a certain number of the most recent samples (e.g., 5, 10, 15, 20, etc.). As such the mean downstream air pressure, the downstream pressure variance, the set of pressure drops, the mean pressure drop, the pressure drop variance, and the variance delta may be determined after each sample (e.g., each cycle). As a result, the impending plugging condition may be identified throughout the operation of the agricultural system.

In certain embodiments, the operator may input the threshold value into the user interface 84, and the user interface 84, in turn, may output the threshold value to the controller 78. The controller 78 may store the threshold value within the memory device 82. Furthermore, in certain embodiments, the controller 78 may determine the threshold value via machine learning. For example, the controller may determine the variance delta throughout the operation of the agricultural system. If the impending plugging condition is not detected, but plugging is detected, the controller may store the variance delta(s) for the period before the plugging is detected. The controller may use these variance delta(s) (e.g., in combination with other variance delta(s) determined before plugging is detected, such as during other instances of plugging during operation of the agricultural system and/or during other instances of plugging during operation of other agricultural system(s)) to train the machine learning process. The controller may then determine a threshold value that substantially reduces or eliminates the possibility of plugging using the machine learning process. The machine learning process may be trained while the agricultural system/other agricultural system(s) are distributing the same type of agricultural product (e.g., same type of seed, same type of fertilizer, etc.), operating in the same environmental conditions (e.g., air temperature, air pressure, etc.), using the same system configuration (e.g., number of row units, configuration of primary lines, etc.), or a combination thereof. Additionally or alternatively, the machine learning process may be trained while the agricultural system/other agricultural system(s) are distributing different types of agricultural product, operating in different environmental conditions, using different system configurations, or a combination thereof. In certain embodiments, the machine learning process may generate different threshold values (e.g., as represented by table(s), empirical formula(s), curve fit(s), etc.) that vary based on agricultural product type, environmental conditions, system configuration, or a combination thereof. Furthermore, in certain embodiments, the controller may be configured to determine the threshold value based on one or more parameters, such as the type of agricultural product, the moisture content of the agricultural product, the expected flow rate of the agricultural product from the metering system, the system configuration, the environmental conditions, other suitable parameter(s), or a combination thereof.

In certain embodiments, the output signal is indicative of instructions to present a notification to an operator of the agricultural system indicative of the impending plugging condition. For example, the controller 78 may output the output signal to the user interface 84. In response to receiving the output signal, the user interface 84 may present a notification to the operator indicative of the impending plugging condition (e.g., visually via the display 86). For example, the user interface 84 may turn an anti-plugging indicator on the display 86 red and/or output an audible indication of the impending plugging condition.

Additionally or alternatively, the output signal is indicative of instructions to increase an air flow rate through the primary line 38. In the illustrated embodiment, the controller 78 is communicatively coupled to the air source 34 and configured to control the air source 34 to adjust the air flow rate through the primary line 38. As used herein, "air flow rate" refers to a mass air flow rate, a volumetric air flow rate, an air speed, or another suitable air flow rate. In certain embodiments, the controller 78 may output the output signal to the air source 34 indicative of instructions to increase the air flow rate (e.g., mass air flow rate) through the primary line 38 by a selected or determined amount (e.g., 10 kg/hr, 20 kg/hr, 30 kg/hr, 40 kg/hr, 50 kg/hr, 100 kg/hr, 150 kg/hr, etc.). The amount may be selected via input to the user interface 84. Alternatively, the controller 78 may determine the amount based on the variance delta. For example, the controller may determine the amount based on the difference between the variance delta and the threshold value (e.g., the amount may be larger for a larger difference, and the amount may be smaller for a smaller difference).

A certain time period (e.g., number of samples, such as 10 samples) after the air flow rate through the primary line 38 is increased by the selected or determined amount, the controller 78 may determine the variance delta (e.g., via the method disclosed above). If the variance delta is greater than the threshold value, the controller 78 may identify the impending plugging condition and, in response, progressively increase the air flow rate, as discussed in detail below. However, if the variance delta is less than or equal to the threshold value, the controller 78 may determine that the impending plugging condition is terminated. In response, the controller 78 may maintain the air flow rate (e.g., the air flow rate that has been increased by the selected or determined amount). Alternatively, the controller 78 may output a second output signal to the air source 34 indicative of instructions to reduce the air flow rate through the primary line 38 (e.g., to an initial value before the air flow rate is increased by the selected or determined amount) in response to determining the impending plugging condition is terminated, or the controller 78 may output the second output signal to the air source 34 indicative of instructions to reduce the air flow rate in response to determining the impending plugging condition is terminated for a threshold duration (e.g., threshold number of samples, such as 10 samples).

In certain embodiments, after the air flow rate is increased by the selected or determined amount, the controller 78 may iteratively perform the following steps (e.g., using any suitable interval, such as 0.05 seconds, 0.1 seconds, 0.25 seconds, 0.5 seconds, 1 second, 1.5 seconds, 2 seconds, 3 seconds, 4 seconds, 5 seconds, etc.). First, the controller may determine the variance delta after the air flow rate through the primary line 38 is increased (e.g., via the method disclosed above). Next, the controller 78 may identify the impending plugging condition in response to determining the variance delta is greater than the threshold value. The controller 78 may then output the output signal indicative of instructions to increase the air flow rate (e.g., mass air flow rate) through the primary line by an air flow rate increment (e.g., mass air flow rate increment), such as 0.1 percent, 0.2 percent, 0.3 percent, 0.5 percent, 1 percent, 2 percent, or 4 percent of the air flow rate (e.g., mass air flow rate), in response to identifying the impending plugging condition. These steps may be iteratively repeated until the variance delta is less than or equal to the threshold value, which indicates that the impending plugging condition is terminated. Accordingly, the air flow rate through the primary line 38 is progressively increased until the impending plugging condition is terminated. While performing the process of progressively increasing the air flow rate until the impending plugging condition is terminated after the air flow rate is increased by the selected or determined amount is disclosed above, in certain embodiments, the process may be performed without first increasing the air flow rate by the selected or determined amount. Furthermore, in certain embodiments, in response to determining that the variance delta is less than or equal to the threshold value (e.g., termination of the impending plugging condition), the controller 78 may output the second output signal to the air source 34 indicative of instructions to reduce the air flow rate through the primary line 38 (e.g., to an initial value before the air flow rate is initially increased). Alternatively, the controller 78 may output the second output signal to the air source 34 indicative of instructions to reduce the air flow rate in response to termination of the impending plugging condition for a threshold duration (e.g., threshold number of samples, such as 10 samples).

In certain embodiments, the controller 78 may determine the air flow rate increment via machine learning. For example, the controller may use feedback including undershoot of the threshold value as the air flow rate increases, the number of air flow rate increments sufficient to reduce the variance delta to or below the threshold value, other suitable parameters, or a combination thereof, to train the machine learning process. The controller may then determine an air flow rate increment that reduces undershoot and reduces the number of increments sufficient to reduce the variance delta to or below the threshold value using the machine learning process. The machine learning process may be trained while the agricultural system is in operation, such as when the agricultural system is distributing the same agricultural product (e.g., same type of seed, same type of fertilizer, etc.). Additionally or alternatively, the machine learning process may be trained while the agricultural system and/or other agricultural system(s) are distributing different types of agricultural product, operating in different environmental conditions, using different system configurations, or a combination thereof. In certain embodiments, the machine learning process may generate different air flow rate increments (e.g., as represented by table(s), empirical formula(s), curve fit(s), etc.) that vary based on agricultural product type, environmental conditions, system configuration, or a combination thereof. Furthermore, in certain embodiments, the controller may be configured to determine the air flow rate increment based on the variance delta. For example, the controller may determine a larger air flow rate increment for a larger variance delta, and the controller may determine a smaller air flow rate increment for a smaller variance delta. In addition, in certain embodiments, the air flow rate increment may be input into the user interface 84, and the user interface 84, in turn, may output the air flow rate increment to the controller 78.

While increasing the air flow rate through the primary line in response to identifying the impending plugging condition is disclosed above, in certain embodiments, other parameters of the agricultural system may be controlled in response to identifying the impending plugging condition (e.g., alone or in combination with increasing the air flow rate through the primary line). For example, in certain embodiments, the controller 78 may be communicatively coupled to the drive assembly 58. In such embodiments, the controller 78 may control the drive assembly 58 to reduce the flow rate of the agricultural product into the primary line 38 in response to identifying the impending plugging condition. However, by reducing the flow rate of the agricultural product into the primary line 38, the amount of agricultural product disposed within the soil may be reduced. Accordingly, in certain embodiments, the controller may be configured to instruct a speed control system (e.g., of the work vehicle towing the agricultural seeding implement and the air cart) to reduce the speed of the agricultural system based on the reduced flow rate of the agricultural product into the primary line 38, thereby substantially maintaining the target application rate (e.g., mass per area) of the agricultural product. In embodiments with independently controllable meter rollers, the controller may control the drive assembly to reduce the flow rate of the agricultural product into the primary line(s) associated with the identified impending plugging condition(s). Furthermore, upon termination of the impending plugging condition (e.g., for a threshold duration), the controller may control the drive assembly to increase the flow rate of the agricultural product (e.g., to an initial flow rate).

While the plug detection system includes two sensors in the illustrated embodiment, in other embodiments, the plug detection system may include more sensors, such as 2, 3, 4, 5, 6 or more. In such embodiments, the controller may identify an impending plugging condition (e.g., via the method disclosed above) within a region between any pair of sensors. For example, the controller may identify an impending plugging condition within a first region between a first pair of sensors, and the controller may identify an impending plugging condition within a second region between a second pair of sensors. In certain embodiments, the regions may overlap (e.g., based on which sensors are selected for each pair).

Furthermore, while the distribution lines 30 include three secondary lines 40 extending from the distribution header 42 to three respective row units 18 in the illustrated embodiment, in other embodiments, the distribution lines may include more or fewer secondary lines extending from the distribution header to respective row units. Furthermore, in certain embodiments, a secondary distribution header may be coupled to at least one secondary line, and tertiary lines may extend from the secondary distribution header to respective row units. In addition, in certain embodiments, the distribution header and the secondary lines may be omitted. In such embodiments, the primary line may extend directly to a respective row unit.

While the plug detection system is disclosed above with reference to one primary line, in certain embodiments, the plug detection system may identify impending plugging conditions associated with multiple primary lines. In such embodiments, the plug detection system may include a pair of sensors for each monitored primary line. For example, the plug detection system may include a pair of sensors for each primary line of the distribution lines. Alternatively, the plug detection system may be configured to monitor a portion of the primary lines (e.g., primary lines that provide the agricultural product to row units at the center of the agricultural seeding implement, such that the possibility of agricultural product flow termination due to sectional control is reduced), and the plug detection system may include a pair of sensors for each primary line of the portion. Furthermore, in embodiments in which multiple primary lines are monitored, the controller may output a respective output signal indicative of an impending plugging condition in response to identifying the impending plugging condition associated with a respective primary line. In certain embodiments, each output signal may be indicative of instructions to present a notification to the operator. In such embodiments, the user interface may present the indication of the impending plugging condition and identify which primary line is associated with the impending plugging condition. Additionally or alternatively, each output signal may be indicative of instructions to increase the air flow rate. In such embodiments, the air flow rate from the air source may increase in response to the air source receiving the output signal, thereby increasing the flow rate of the air through all of the primary lines. In certain embodiments, the air flow rate through each primary line or through a group of primary lines may be independently adjustable (e.g., via independently controllable fans/blowers of the air source, via valves in the plenum, etc.). In such embodiments, the controller may only increase the air flow rate through the primary line(s) associated with the identified impending plugging condition(s).

In addition, while the plug detection system is configured to monitor air pressures within the primary line(s) in the embodiments disclosed above, in certain embodiments, the plug detection system may monitor air pressures within one or more secondary lines. For example, in certain embodiments, the plug detection system may include at least one pair of sensors configured to monitor air pressures within respective secondary line(s). In such embodiments, the controller may identify an impending plugging condition (e.g., via the method disclosed above) associated with each monitored secondary line. The controller may then output an output signal indicative of each impending plugging condition (e.g., indicative of a notification, indicative of instructions to increase the air flow rate, etc.) in response to identifying the impending plugging condition.

Figure 3:
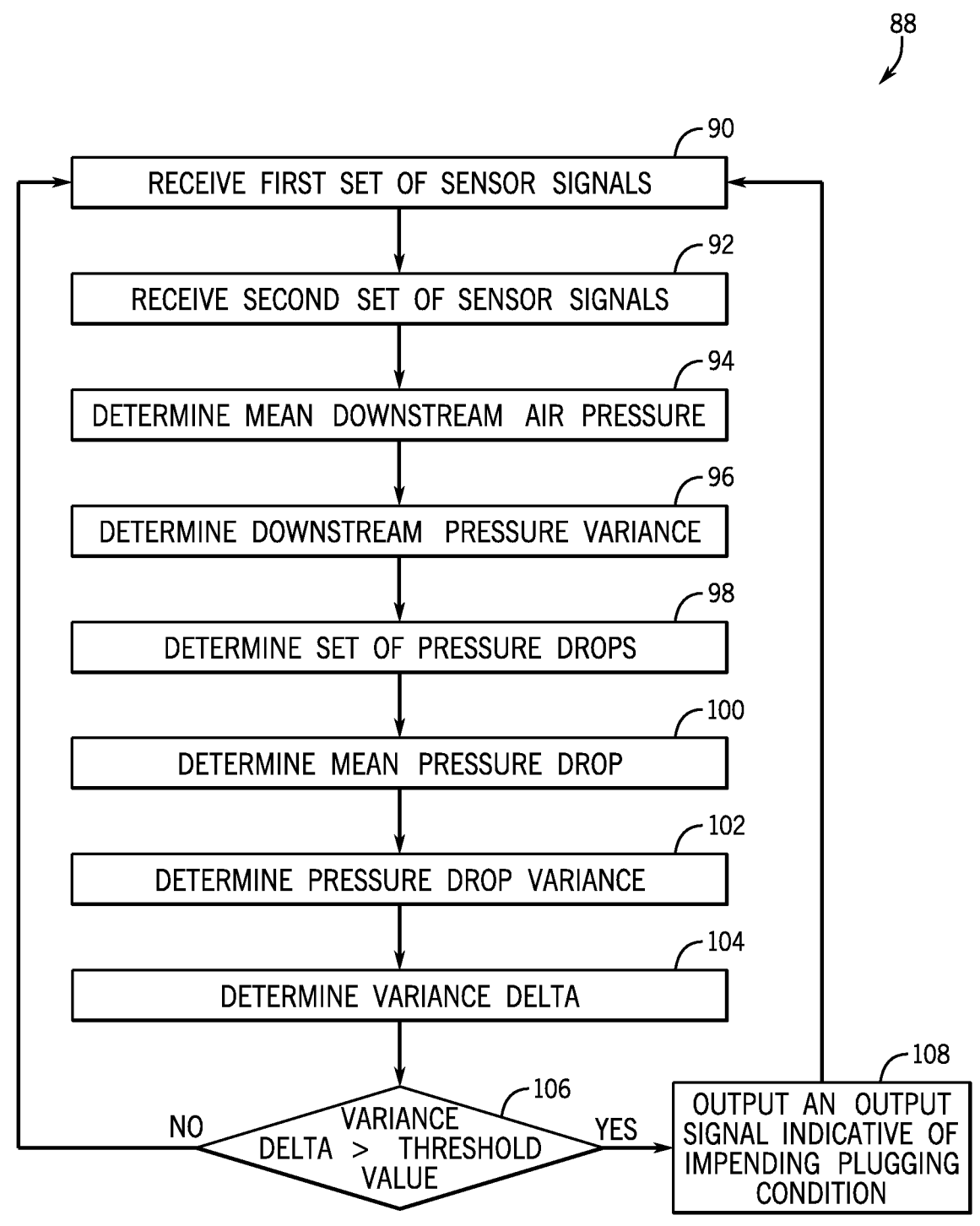
FIG. 3 is a flowchart of an embodiment of a method for identifying an impending plugging condition within the agricultural system of FIG. 1.

FIG. 3 is a flowchart of an embodiment of a method 88 for identifying an impending plugging condition within the agricultural system of FIG. 1. The method 88 may be performed by the controller disclosed above with reference to FIG. 2 or any other suitable controller(s). Furthermore, the steps of the method 88 may be performed in the order disclosed herein or in any other suitable order. For example, certain steps of the method may be performed concurrently. In addition, in certain embodiments, at least one of the steps of the method 88 may be omitted.

The method 88 includes receiving a first set of sensor signals indicative of a set of upstream air pressures at an upstream location of a primary line between a metering system and a row unit, as represented by block 90. The method 88 also includes receiving a second set of sensor signals indicative of a set of downstream air pressures at a downstream location of the primary line between the metering system and the row unit, as represented by block 92. The downstream location is downstream of the upstream location. As previously discussed, the first set of sensor signals may be received from a first sensor, and the second set of sensor signals may be received from a second sensor.

Furthermore, the method 88 includes determining a mean downstream air pressure based on the set of downstream air pressures, as represented by block 94. As previously discussed, the mean downstream air pressure may be determined by summing the downstream air pressures within the set and dividing by the number of downstream air pressures within the set. In addition, the method 88 includes determining a downstream pressure variance based on the set of downstream air pressures and the mean downstream air pressure, as represented by block 96. As previously discussed, the downstream pressure variance may be determined using the downstream pressure variance equation disclosed above with reference to FIG. 2.

The method 88 also includes determining a set of pressure drops based on the set of upstream air pressures and the set of downstream air pressures, as represented by block 98. As previously discussed, the set of pressure drops may be determined by subtracting each downstream air pressure of the set of downstream air pressures from a respective upstream air pressure of the set of upstream air pressures. Furthermore, the method 88 includes determining a mean pressure drop based on the set of pressure drops, as represented by block 100. As previously discussed, the mean pressure drop may be determined by summing the pressure drops within the set and dividing by the number of pressure drops within the set.

In addition, the method 88 includes determining a pressure drop variance based on the set of pressure drops and the mean pressure drop, as represented by block 102. As previously discussed, the pressure drop variance may be determined using the pressure drop variance equation disclosed above with reference to FIG. 2. The method 88 also includes determining a variance delta based on the pressure drop variance and the downstream pressure variance, as represented by block 104. As previously discussed, the variance delta may be determined by subtracting the pressure drop variance from the downstream pressure variance.

The method also includes comparing the variance delta to a threshold value, as represented by block 106. As previously discussed, the threshold value may be input into the user interface, or the controller may determine the threshold value (e.g., via machine learning). In response to determining that the variance delta is less than or equal to the threshold value, the method returns to block 90. Furthermore, in response to determining that the variance delta is greater than the threshold value, an impending plugging condition is identified, and an output signal indicative of the impending plugging condition is output in response to identifying the impending plugging condition, as represented by block 108. As previously discussed, the impending plugging condition may correspond to an operating condition (e.g., with insufficient air flow) that has a substantial potential to ultimately result in plugging (e.g., a buildup of agricultural product within the primary line and/or within at least one of the secondary lines downstream from the primary line). Furthermore, as previously discussed, the output signal may be indicative of instructions to present a notification to an operator of the agricultural system indicative of the impending plugging condition, and/or the output signal may be indicative of instructions to increase an air flow rate (e.g., mass air flow rate) through the primary line.

Figure 4:
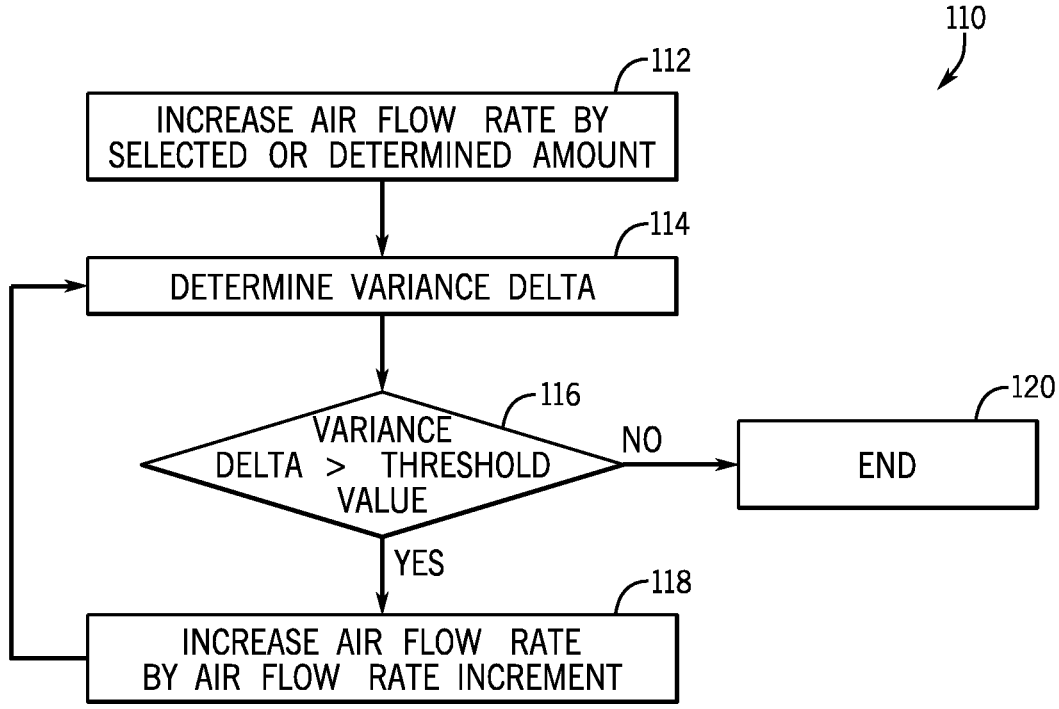
FIG. 4 is a flowchart of an embodiment of a method for controlling an air flow rate that may be performed within the method of FIG. 3.

FIG. 4 is a flowchart of an embodiment of a method 110 for controlling an air flow rate that may be performed within the method of FIG. 3. The method 110 may be performed by the controller disclosed above with referenced to FIG. 2 or any other suitable controller(s). Furthermore, the steps of the method 110 may be performed in the order disclosed herein or in any other suitable order. For example, certain steps of the method may be performed concurrently. In addition, in certain embodiments, at least one of the steps of the method 110 may be omitted.

The method 110 for controlling the air flow rate may be performed after determining that the variance delta is greater than the threshold value, as represented by block 106 in FIG. 3. The method 110 includes outputting the output signal to the air source indicative of instructions to increase the air flow rate through the primary line by a selected or determined amount, as represented by block 112. In certain embodiments, the step represented by block 112 in FIG. 4 may correspond to/be a part of outputting the output signal indicative of the impending plugging condition, as represented by block 108. As previously discussed, the amount may be selected via input to the user interface, or the amount may be determined by the controller (e.g., based on the variance delta).

The method 110 also includes the following steps, which are performed iteratively. The iteratively performed steps include determining the variance delta after the air flow rate through the primary line is increased, as represented by block 114. For example, the variance delta may be determined via steps represented by blocks 90-104 of the method disclosed above with reference to FIG. 3. The iteratively performed steps also include comparing the variance delta to the threshold value, as represented by block 116. In response to determining that the variance delta is greater than the threshold value, an impending plugging condition is identified, and the output signal indicative of instructions to increase the air flow rate through the primary line by an air flow rate increment is output in response to identifying the impending plugging condition, as represented by block 118. As previously discussed, the air flow rate increment may be determined via machine learning, or the air flow rate increment may be input into the user interface. The steps corresponding to blocks 114, 116, and 118 are repeated until the variance delta is less than or equal to the threshold value.

In response to determining that the variance delta is less than or equal to the threshold value, which may indicate that the impending plugging condition is terminated, the process of progressively increasing the air flow rate by the air flow rate increment is terminated (e.g., such that the increased air flow rate is maintained), as represented by block 120. Furthermore, in certain embodiments, an output signal indicative of instructions to present a notification to an operator indicative of termination of the impending plugging condition may be output in response to determining the impending plugging condition is terminated or in response to determining the impending plugging condition is terminated for a threshold duration. In certain embodiments, the value of the increased air flow rate may be stored (e.g., as an initial air flow rate for subsequent operations). In addition, in certain embodiments, a second output signal may be output to the air source indicative of instructions to reduce the air flow rate through the primary line (e.g., to an initial value before the air flow rate is increased by the selected/determined amount) in response to determining the impending plugging condition is terminated. Alternatively, in certain embodiments, the second output signal may be output to the air source indicative of instructions to reduce the air flow rate in response to determining the impending plugging condition is terminated for a threshold duration (e.g., threshold number of samples, such as 10 samples).

In certain embodiments, the step of increasing the air flow rate by the selected or determined amount, as represented by block 112, may be omitted. Furthermore, in certain embodiments, the steps of progressively increasing the air flow rate by the air flow rate increment, as represented by blocks 114, 116, and 118, may be omitted. In addition, in certain embodiments, the method 110 for controlling the air flow rate may not be performed within the method of FIG. 3. In embodiments in which the step of increasing the air flow rate by the selected or determined amount is omitted, the step of outputting the output signal indicative of the impending plugging condition, as represented by block 108 of FIG. 3, may include outputting the output signal indicative of instructions to increase the air flow rate through the primary line by the air flow rate increment, and the steps of progressively increasing the air flow rate by the air flow rate increment, as represented by block 114, 116, and 118, may be performed after the step of outputting the output signal indicative of the impending plugging condition.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A plug detection system for an agricultural system, comprising:

a controller comprising a memory and a processor, wherein the controller is configured to:

receive a first plurality of sensor signals indicative of a plurality of upstream air pressures at an upstream location of a primary line between a metering system and a row unit;

receive a second plurality of sensor signals indicative of a plurality of downstream air pressures at a downstream location of the primary line between the metering system and the row unit, wherein the downstream location is downstream from the upstream location;

determine a mean downstream air pressure based on the plurality of downstream air pressures;

determine a downstream pressure variance based on the plurality of downstream air pressures and the mean downstream air pressure;

determine a plurality of pressure drops based on the plurality of upstream air pressures and the plurality of downstream air pressures;

determine a mean pressure drop based on the plurality of pressure drops;

determine a pressure drop variance based on the plurality of pressure drops and the mean pressure drop;

determine a variance delta based on the pressure drop variance and the downstream pressure variance;

identify an impending plugging condition in response to determining the variance delta is greater than a threshold value; and output an output signal indicative of the impending plugging condition in response to identifying the impending plugging condition.

2. The plug detection system of claim 1, wherein the output signal is indicative of instructions to present a notification to an operator of the agricultural system indicative of the impending plugging condition.

3. The plug detection system of claim 1, wherein the output signal is indicative of instructions to increase an air flow rate through the primary line.

4. The plug detection system of claim 3, wherein the controller is configured to iteratively:

determine the variance delta after the air flow rate through the primary line is increased;

identify the impending plugging condition in response to determining the variance delta is greater than the threshold value; and output the output signal indicative of instructions to increase the air flow rate through the primary line by an air flow rate increment in response to identifying the impending plugging condition.

5. The plug detection system of claim 4, wherein the controller is configured to determine the air flow rate increment via machine learning.

6. The plug detection system of claim 3, wherein the air flow rate comprises a mass air flow rate.

7. The plug detection system of claim 1, wherein the controller is configured to determine the threshold value via machine learning.

8. An agricultural system, comprising:

an air source configured to output an air flow;

a primary line extending from the air source;

a metering system configured to meter agricultural product into the primary line; and a plug detection system, comprising:

a first sensor configured to output a first plurality of sensor signals indicative of a plurality of upstream air pressures, wherein the first sensor is fluidly coupled to the primary line at an upstream location between the metering system and a row unit;

a second sensor configured to output a second plurality of sensor signals indicative of a plurality of downstream air pressures, wherein the second sensor is fluidly coupled to the primary line at a downstream location between the metering system and the row unit, and the downstream location is downstream from the upstream location; and a controller comprising a memory and a processor, wherein the controller is communicatively coupled to the first sensor and to the second sensor, and the controller is configured to:

receive the first plurality of sensor signals;

receive the second plurality of sensor signals;

determine a mean downstream air pressure based on the plurality of downstream air pressures;

determine a downstream pressure variance based on the plurality of downstream air pressures and the mean downstream air pressure;

determine a plurality of pressure drops based on the plurality of upstream air pressures and the plurality of downstream air pressures;

determine a mean pressure drop based on the plurality of pressure drops;

determine a pressure drop variance based on the plurality of pressure drops and the mean pressure drop;

determine a variance delta based on the pressure drop variance and the downstream pressure variance;

identify an impending plugging condition in response to determining the variance delta is greater than a threshold value; and output an output signal indicative of the impending plugging condition in response to identifying the impending plugging condition.

9. The agricultural system of claim 8, wherein the plug detection system comprises a user interface communicatively coupled to the controller, and the output signal is indicative of instructions to the user interface to present a notification to an operator of the agricultural system indicative of the impending plugging condition.

10. The agricultural system of claim 8, wherein the controller is communicatively coupled to the air source, and the output signal is indicative of instructions to the air source to increase an air flow rate of the air flow through the primary line.

11. The agricultural system of claim 10, wherein the controller is configured to iteratively:

determine the variance delta after the air flow rate through the primary line is increased;

identify the impending plugging condition in response to determining the variance delta is greater than the threshold value; and output the output signal indicative of instructions to increase the air flow rate through the primary line by an air flow rate increment in response to identifying the impending plugging condition.

12. The agricultural system of claim 11, wherein the controller is configured to determine the air flow rate increment via machine learning.

13. The agricultural system of claim 10, wherein the air flow rate comprises a mass air flow rate.

14. The agricultural system of claim 8, wherein the controller is configured to determine the threshold value via machine learning.

15. A method, comprising:

receiving, via a controller comprising a memory and a processor, a first plurality of sensor signals indicative of a plurality of upstream air pressures at an upstream location of a primary line between a metering system and a row unit;

receiving, via the controller, a second plurality of sensor signals indicative of a plurality of downstream air pressures at a downstream location of the primary line between the metering system and the row unit, wherein the downstream location is downstream from the upstream location;

determining, via the controller, a mean downstream air pressure based on the plurality of downstream air pressures;

determining, via the controller, a downstream pressure variance based on the plurality of downstream air pressures and the mean downstream air pressure;

determining, via the controller, a plurality of pressure drops based on the plurality of upstream air pressures and the plurality of downstream air pressures;

determining, via the controller, a mean pressure drop based on the plurality of pressure drops;

determining, via the controller, a pressure drop variance based on the plurality of pressure drops and the mean pressure drop;

determining, via the controller, a variance delta based on the pressure drop variance and the downstream pressure variance;

identifying, via the controller, an impending plugging condition in response to determining the variance delta is greater than a threshold value; and outputting, via the controller, an output signal indicative of the impending plugging condition in response to identifying the impending plugging condition.

16. The method of claim 15, wherein the output signal is indicative of instructions to present a notification to an operator of the agricultural system indicative of the impending plugging condition.

17. The method of claim 15, wherein the output signal is indicative of instructions to increase an air flow rate through the primary line.

18. The method of claim 17, comprising iteratively:

determining, via the controller, the variance delta after the air flow rate through the primary line is increased;

identifying, via the controller, the impending plugging condition in response to determining the variance delta is greater than the threshold value; and outputting, via the controller, the output signal indicative of instructions to increase the air flow rate through the primary line by an air flow rate increment in response to identifying the impending plugging condition.

19. The method of claim 18, comprising determining, via the controller, the air flow rate increment via machine learning.

20. The method of claim 15, comprising determining, via the controller, the threshold value via machine learning.

* * * * *